(12) United States Patent
Adhikari

(10) Patent No.: US 8,600,166 B2
(45) Date of Patent: Dec. 3, 2013

(54) REAL TIME HAND TRACKING, POSE CLASSIFICATION AND INTERFACE CONTROL

(75) Inventor: Suranjit Adhikari, San Diego, CA (US)

(73) Assignee: Sony Corporation, Tokyo (JP)

( * ) Notice: Subject to any disclaimer, the term of this patent is extended or adjusted under 35 U.S.C. 154(b) by 519 days.

(21) Appl. No.: 12/897,302

(22) Filed: Oct. 4, 2010

(65) Prior Publication Data
US 2011/0110560 A1    May 12, 2011

Related U.S. Application Data

(60) Provisional application No. 61/258,975, filed on Nov. 6, 2009.

(51) Int. Cl.
*G06K 9/46* (2006.01)

(52) U.S. Cl.
USPC .......................................................... 382/190

(58) Field of Classification Search
None
See application file for complete search history.

(56) References Cited

U.S. PATENT DOCUMENTS

| | | | |
|---|---|---|---|
| 5,581,276 A | 12/1996 | Cipolla et al. | |
| 6,819,782 B1 | 11/2004 | Imagawa et al. | |
| 7,308,112 B2 | 12/2007 | Fujimura et al. | |
| 2006/0136846 A1 | 6/2006 | Im et al. | |
| 2006/0187196 A1 | 8/2006 | Underkoffler et al. | |
| 2007/0252898 A1 | 11/2007 | Delean | |
| 2008/0085048 A1 | 4/2008 | Venetsky et al. | |
| 2010/0215257 A1* | 8/2010 | Dariush et al. | 382/159 |

FOREIGN PATENT DOCUMENTS

| | | |
|---|---|---|
| JP | 2004-258837 | 9/2004 |
| JP | 2008-222097 | 9/2008 |
| JP | 2008-257353 | 10/2008 |
| JP | 2008-301693 | 12/2008 |
| JP | 2009-14009 | 6/2009 |

OTHER PUBLICATIONS

Wang et al., "Real-Time Hand-Tracking with a Color Glove", ACM Trans. Graph. 28, 3, Article 63, Aug. 2009, 8 pages.*
Ren et al., "Hand Gesture Recognition Based on MEB-SVM", IEEE Embedded Software and Systems, May 2009, pp. 344-349.*
Kjellstrom et al., "Simultaneous Visual Recognition of Manipulation Actions and Manipulated Objects", ECCV 2008, Part II, LNCS 5303, pp. 336-349, Springer-Verlag Berlin Heidelberg, copyright 2008.*
Zhou et al., "Visual Mouse: SIFT Detection and PCA Recognition," International Conference on Computational Intelligence and Security Workshops, 2007.
Kölsch et al., "Fast 2D Hand Tracking With Flocks of Features and Multi-Cue Integration," IEEE Computer Society Conference on Computer Vision and Pattern Recognition Workshops, 2004.

(Continued)

*Primary Examiner* — Brian P Werner
(74) *Attorney, Agent, or Firm* — Miller Patent Services; Jerry A. Miller

(57) ABSTRACT

A hand gesture from a camera input is detected using an image processing module of a consumer electronics device. The detected hand gesture is identified from a vocabulary of hand gestures. The electronics device is controlled in response to the identified hand gesture. This abstract is not to be considered limiting, since other embodiments may deviate from the features described in this abstract.

30 Claims, 7 Drawing Sheets

(56) References Cited

OTHER PUBLICATIONS

Shimada et al., "Real-Time 3-D Hand Posture Estimation Based on 2-D Appearance Retrieval Using Monocular Camera," IEEE ICCV Workshop on Regcognition, Analysis, and Tracking of Faces and Gestures in Real-Time Systems, 2001.
International Search Report and Written Opinion, corresponding PCT Application No. PCT/US2010/054782, issued Aug. 2, 2011.
Japanese Office Action and English translation, corresponding Japanese Patent Application No. 2012-53446, Sep. 16, 2013, received Oct. 17, 2013.
Suda, Y. et al., "Composition of Human Movement from a Single Image by Using Blur Scale and Color Information," IEICE Technical Research Report, Japan, IEICE, vol. 103, No. 651, pp. 65-70, Feb. 6, 2004, received Oct. 17, 2013. ** Translation of Abstract only. Relevance discussed in Office action.

* cited by examiner

REAL TIME HAND TRACKING, POSE CLASSIFICATION AND INTERFACE CONTROL

CROSS REFERENCE TO RELATED DOCUMENTS

This application claims priority to and claims the benefit of U.S. Provisional Patent Application Ser. No. 61/258,975 titled "REAL TIME HAND TRACKING AND POSE CLASSIFICATION USING SIFT AND KLT," which was filed in the United States Patent Office on Nov. 6, 2009, and which is incorporated herein by reference in its entirety.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

A hand presents a motion of twenty seven (27) degrees of freedom (DOF). Of the twenty seven degrees of freedom, twenty one (21) represent joint angles and six (6) represent orientation and location. Hand tracking conventionally utilizes colored gloves and color pattern matching, retro-reflective markers attached to a hand using an array of overlapping cameras (e.g., stereoscopic camera systems), or instrumented gloves/sensor systems.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
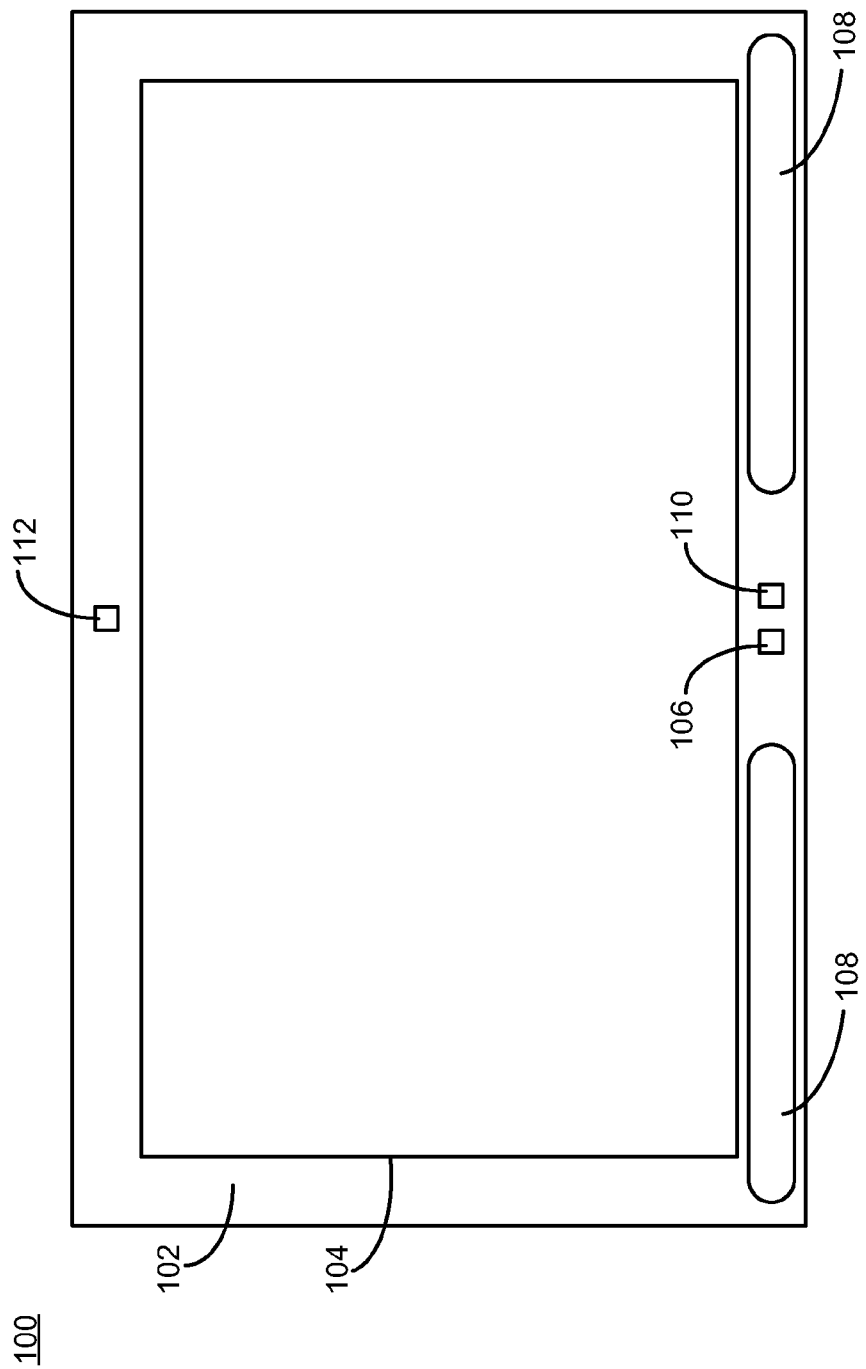
FIG. 1 is a diagram of an example of an implementation of a television capable of performing automated real time hand tracking, pose classification, and interface control consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "program" or "computer program" or similar terms, as used herein, is defined as a sequence of instructions designed for execution on a computer system. A "program," or "computer program," may include a subroutine, a function, a procedure, an object method, an object implementation, in an executable application, an applet, a servlet, a source code, an object code, a shared library/dynamic load library and/or other sequence of instructions designed for execution on a computer system having one or more processors.

The term "program," as used herein, may also be used in a second context (the above definition being for the first context). In the second context, the term is used in the sense of a "television program." In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment," "certain embodiments," "an embodiment," "an implementation," "an example" or similar terms means that a particular feature, structure, or characteristic described in connection with the example is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

The present subject matter provides automated real time hand tracking, pose classification, and interface control. The present subject matter may be used in association with systems that identify and categorize hand poses and hand pose changes for a bare hand. The present subject matter may also be used in association with user interface control systems to allow hand gestures to control a device, such as a consumer electronics device. The real time hand tracking, pose classification, and interface control described herein is further adaptable to allow user formation of input controls based upon hand gestures. Additionally, hand characteristics of each individual user of a user interface system, such as characteristics resulting from injury or other characteristics, may be processed and configured in association with gesture-based control of consumer electronics devices to allow individualized automated recognition of hand gestures to control common or different user interface controls. Many other possibilities exist for real time hand tracking, pose classification, and interface control and all are considered within the scope of the present subject matter.

Example detected hand gestures that may be identified and used to control a device, such as a consumer electronics device, include detection of a "thumbs-up" hand gesture or a "pointing-up" hand gesture that may be identified and associated with a control command to turn on a consumer electronics device. Similarly, detection of a "thumbs-down" or a "pointing-down" hand gesture, for example, may be identified and associated with a control command to turn off a consumer electronics device. Any hand gesture that may be detected and identified based upon the present subject matter may be used to control an interface, such as a user interface, of a device. Additionally, hand gestures may be created by a user and assigned to control functions in response to hand gesture inputs. Many possibilities exist for user interface control and all are considered within the scope of the present subject matter.

The present subject matter may operate using a single camera, such as a monocular camera, and a data driven approach that uses scale invariant feature transforms (SIFT) descriptors and pixel intensity/displacement descriptors as extracted features to not only track but also classify articulated poses of a hand in three dimensions. However, it should be noted that the processing described herein may be extended to use multiple cameras which may dramatically increase accuracy. The real time aspect allows it to be integrated into consumer electronic devices. It may also have application in three dimensional (3D) modeling, new desktop user-interfaces, and multi touch interfaces. Real-time embedded systems may also be improved by creating a more intuitive interface device for such implementations.

SIFT is a technique for processing images that extracts salient feature descriptors that are invariant to rotation, translation, scaling. As such, SIFT descriptors may be considered robust for matching, recognition, and image registration tasks. Pixel intensity/displacement is a technique for processing images that uses pixel intensity and locality of displacement of pixels in relation to its neighboring pixels to track pixels within images. Features to track within a sequence of images are those pixels that are determined by calculating an image gradient between one image and the same image displaced by a known value and forming an image gradient matrix. If the Eigen values of the images gradient matrix are greater than a specified threshold, such as for example a magnitude ten (10.0), each such feature may be considered a feature that provides information suitable for tracking purposes. Kanade, Lucas, and Tomasi (KLT) descriptors represent one possible form of pixel intensity/displacement descriptors that may be used. However, it is understood that any form of pixel intensity/displacement descriptors may be used as appropriate for a given implementation.

The tracking aspect may include tracking out-of-plane rotations and other characteristics of a hand in motion. The classified articulated poses of a hand in three dimensions may be associated with user interface controls for consumer electronics devices. A configuration and training mode allows customized pose orientations to be associated with specific controls for an electronic system. Because bare-hand tracking and pose recognition is performed using a single camera, conventional techniques that utilize retro-reflective markers, arrays of cameras, or other conventional techniques are not needed. Further, resolution and scope may be maintained while performing the hand tracking, pose classification, and interface control in real time.

The subject matter described herein may be utilized to capture increased degrees-of-freedom, enabling direct manipulation tasks and recognition of an enhanced set of gestures when compared with certain conventional technologies. The approach described herein illustrates examples of a data-driven approach that allows a single frame to be used to correctly identify a pose, based upon a reduced set of stored pose information. Robust scale invariant features are extracted from a single frame of a hand pose and a multiclass support vector machine (SVM) is utilized to classify the pose in real time. Multiple-hypothesis inference is utilized to allow real time bare-hand tracking and pose recognition.

The present subject matter facilitates real time performance by use of a choice of image features and by use of multiclass SVM to infer a closest pose image that allows rapid retrieval of a closest match. Regarding the choice of image features, both SIFT and pixel intensity/displacement features may be calculated rapidly and the multiclass SVM may use similar filters to extract salient information to expedite extraction speed. Because the multiclass SVM is trained on prior image sets, retrieval rate may be further improved. Additional details of the processing performed in association with the present subject matter will be described following some introductory example architectures upon which the present subject matter may be implemented.

Turning now to FIG. 1, FIG. 1 is a diagram of an example of an implementation of a television 100 capable of performing automated real time hand tracking, pose classification, and interface control. It should be noted that use of the television 100 within the present example is for purposes of illustration only. As such, a system that implements the automated real time hand tracking, pose classification, and interface control described herein may form a portion of a hand-held consumer electronics device or any other suitable device without departure from the scope of the present subject matter.

An enclosure 102 houses a display 104 that provides visual and/or other information to a user of the television 100. The display 104 may include any type of display device, such as a cathode ray tube (CRT), liquid crystal display (LCD), light emitting diode (LED), projection or other display element or panel. The display 104 may also include a touchscreen display, such as a touchscreen display associated with a hand-held consumer electronics device or other device that includes a touchscreen input device.

An infrared (IR) (or radio frequency (RF)) responsive input device 106 provides input capabilities for the user of the television 100 via a device, such as an infrared remote control device (not shown). An audio output device 108 provides audio output capabilities for the television 100, such as audio associated with rendered content. The audio output device 108 may include a pair of speakers, driver circuitry, and interface circuitry as appropriate for a given implementation.

A light emitting diode (LED) output module 110 provides one or more output LEDs and associated driver circuitry for signaling certain events or acknowledgements to a user of the television 100. Many possibilities exist for communicating information to a user via LED signaling and all are considered within the scope of the present subject matter.

A camera 112 provides image capture capabilities for the television 100. Images captured by the camera 112 may be processed, as described in more detail below, to perform the automated real time hand tracking, pose classification, and interface control associated with the present subject matter.

Figure 2:
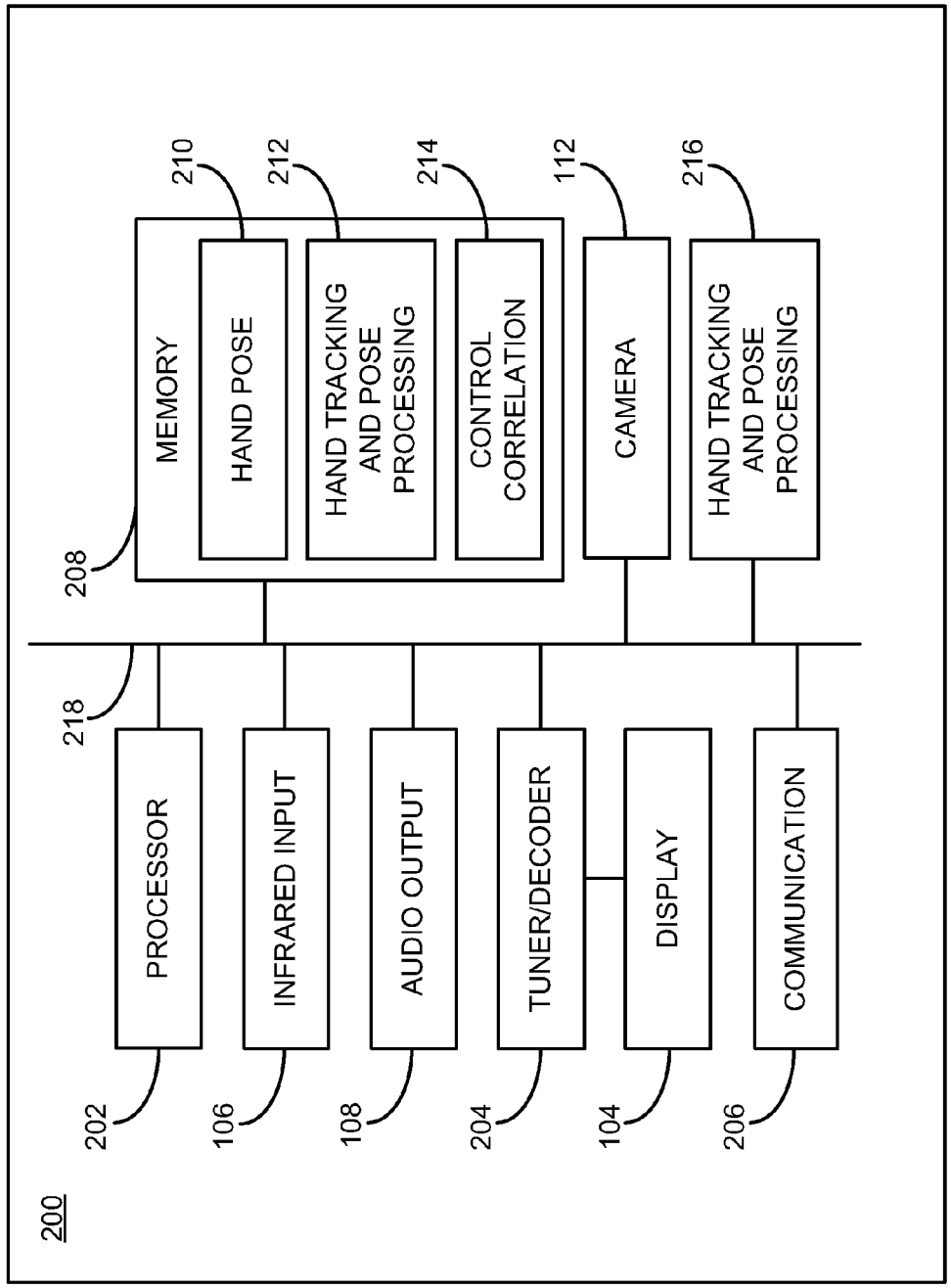
FIG. 2 is a block diagram of an example core processing module that provides automated real time hand tracking, pose classification, and interface control in association with the television of FIG. 1 consistent with certain embodiments of the present invention.

FIG. 2 is a block diagram of an example core processing module 200 that provides automated real time hand tracking, pose classification, and interface control in association with the television 100 of FIG. 1. The core processing module 200 may be integrated into the television 100 or implemented as part of a separate interconnected module as appropriate for a given implementation. A processor 202 provides computer instruction execution, computation, and other capabilities within the core processing module 200. The infrared input device 106 is shown and again provides input capabilities for the user of the television 100 via a device, such as an infrared remote control device (again not shown).

The audio output device 108 is illustrated and again provides audio output capabilities for the core processing module 200. The audio output device 108 may include one or more speakers, driver circuitry, and interface circuitry as appropriate for a given implementation.

A tuner/decoder module 204 receives television (e.g., audio/video) content and decodes that content for display via the display 104. The content may include content formatted either via any of the motion picture expert group (MPEG) standards, or content formatted in any other suitable format for reception by the tuner/decoder module 204. The tuner/decoder module 204 may include additional controller circuitry in the form of application specific integrated circuits (ASICs), antennas, processors, and/or discrete integrated circuits and components for performing electrical control activities associated with the tuner/decoder module 204 for tuning to and decoding content received either via wireless or wired connections to the core processing module 200. The display 104 is illustrated and again provides visual and/or other information for the core processing module 200 via the tuner/decoder module 204.

A communication module 206 may alternatively provide communication capabilities for the core processing module 200, such as for retrieval of still image content, audio and video content, or other content via a satellite, cable, storage media, the Internet, or other content provider, and other activities as appropriate for a given implementation. The communication module 206 may support wired or wireless standards as appropriate for a given implementation. Example wired standards include Internet video link (IVL) interconnection within a home network, for example, such as Sony Corporation's Bravia® Internet Video Link (BIVL™). Example wireless standards include cellular wireless communication and Bluetooth® wireless communication standards. Many other wired and wireless communication standards are possible and all are considered within the scope of the present subject matter.

A memory 208 includes a hand pose storage area 210, a hand tracking and pose processing storage area 212, and a control correlation storage area 214. The hand pose storage area 210 may store information, such as a vocabulary of hand poses captured and utilized for processing the automated real time hand tracking, pose classification, and interface control of the present subject matter. The hand tracking and pose processing storage area 212 may store information, such as images captured by the camera 112 and intermediate and final stages of processing of captured images in association with hand pose identification. The control correlation storage area 214 may store information, such hand positions or hand position identifiers that have been correlated with control commands for the television 100.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

A hand tracking and pose processing module 216 is also illustrated. The hand tracking and pose processing module 216 provides processing capabilities for the core processing module 200 to perform the automated real time hand tracking, pose classification, and interface control, as described above and in more detail below. The camera 112 is illustrated and again provides image capture capabilities for the core processing module 200.

It should be noted that the modules described above in association with the core processing module 200 are illustrated as component-level modules for ease of illustration and description purposes. It is also understood that these modules include any hardware, programmed processor(s), and memory used to carry out the respective functions of these modules as described above and in more detail below. For example, the respective modules may include additional controller circuitry in the form of application specific integrated circuits (ASICs), processors, and/or discrete integrated circuits and components for performing electrical control activities. Additionally, the modules may include interrupt-level, stack-level, and application-level modules as appropriate. Furthermore, the modules may include any memory components used for storage, execution, and data processing by these modules for performing the respective processing activities.

It should also be noted that the hand tracking and pose processing module 216 may form a portion of other circuitry described without departure from the scope of the present subject matter. Further, the hand tracking and pose processing module 216 may alternatively be implemented as an application stored within the memory 208. In such an implementation, the hand tracking and pose processing module 216 may include instructions executed by the processor 202 for performing the functionality described herein. The processor 202 may execute these instructions to provide the processing capabilities described above and in more detail below for the core processing module 200. The hand tracking and pose processing module 216 may form a portion of an interrupt service routine (ISR), a portion of an operating system, a portion of a browser application, or a portion of a separate application without departure from the scope of the present subject matter.

The processor 202, the infrared input device 106, the audio output device 108, the tuner/decoder module 204, the communication module 206, the memory 208, the camera 112, and the hand tracking and pose processing module 216 are interconnected via one or more interconnections shown as interconnection 218 for ease of illustration. The interconnection 218 may include a system bus, a network, or any other interconnection capable of providing the respective components with suitable interconnection for the respective purpose.

The processing described herein includes certain categories of activities. A robust feature set for hand detection and pose inference is extracted and stored. Trained multiclass SVM is used to infer a pose type. The articulated pose is then approximated using inverse kinematics (IK) optimization. Each of these processing aspects will be described in more detail below.

Extraction and Storage of Feature Set

Regarding extraction and storage of a robust feature set for hand detection and pose inference, an improvised flock of features tracking algorithm may be used to track a region of interest (ROI) between subsequent video frames. Flock of features tracking may be used for rapid tracking of non-rigid and highly articulated objects such as hands. Flock of features tracking combines pixel intensity/displacement features and learned foreground color distribution to facilitate two dimensional (2D) tracking. Flock of features tracking further triggers SIFT features extraction. The extracted SIFT features may be used for pose inference. Flock of features tracking assumes that salient features within articulated objects move from frame to frame in a way similar to a flock of birds. The path is calculated using an optical flow algorithm.

Additional conditions or constraints may be utilized in certain implementations, such as for example, that all features maintain a minimum distance from each other, and that such features never exceed a defined distance from a feature median. Within such an implementation, if the condition or constraint is violated, the location of the features may be recalculated and positioned based upon regions that have a high response to skin color filtering. The flock of features behavior improves the tracking of regions of interest across frame transitions, and may further improve tracking for situations where the appearance of region may change over time. The additional cue on skin color allows additional information that may be used when features are lost across a sequence of frames.

Pixel intensity/displacement features are extracted by measuring brightness gradients in multiple directions across the image, a step that is closely related to finding oriented gradient when extracting SIFT descriptors. In combination with generated image pyramids, a feature's image area may be matched efficiently to a "most" similar area within a search window in the following video frame. An image pyramid may be considered a series of progressively smaller-resolution interpolations generated based upon the original image, such as by reducing grayscale within an image by configured percentages (e.g., ten percent (10%)) for iterations of processing probabilities from histogram data of a hand as described in more detail below. The feature size determines the amount of context knowledge that may be used for matching. If the feature match correlation between two consecutive frames is below a configurable threshold, the feature may be considered "lost." As such, configurable thresholds allow resolution adjustment for tracking and identification purposes.

The generated image pyramids may be used to extract both pixel intensity/displacement and SIFT features. Pixel intensity/displacement features may be considered appropriate for tracking purposes. However it is recognized that pixel intensity/displacement features are not invariant to scale or rotation and, as such, are not utilized to infer the hand poses due to accuracy. SIFT features are invariant to image scaling and rotation, and at least partially invariant to change in illumination and 2D camera viewpoint. SIFT features are also well localized in both spatial and frequency domains, which may reduce a probability of disruption by occlusion, clutter, noise, or other factors.

The time impact of extracting the pixel intensity/displacement and SIFT features may be reduced by use of a cascade filtering approach, in which more time-costly operations are applied at locations that pass an initial test. The initial test may involve, for example, dividing the image into thirty two by thirty two (32×32) pixel sub-windows. For each sub-window, keypoints may be calculated using a difference of Gaussian filter. If there are many keypoints in any sub-window, then the complete SIFT descriptor may be calculated. Otherwise, the sub-window may be discarded to eliminate large portions of the image that may not be relevant for hand position detection. SIFT descriptors were chosen for this implementation because SIFT descriptors transform image data into scale-invariant coordinates relative to local features.

Transformation of image data using SIFT descriptors into scale-invariant coordinates relative to local features involves four stages. A first stage includes scale-space extrema detection. A second stage includes keypoint localization. The third stage includes orientation assignment. The fourth stage includes keypoint descriptor transformation.

Regarding scale-space extrema detection, scale-space extrema detection includes a computational search over all scales and image locations. Scale-space extrema detection may be implemented, for example, using a difference-of-Gaussian filter.

Regarding keypoint localization, for each candidate location identified via the scale-space extrema detection, a detailed model is fit to determine location and scale. Keypoints are selected based on measures of their stability within the image or sequence of images. The stability within the image or sequence of images may be defined as keypoints that have high contrast between themselves and their neighboring pixels. This stability may be used to decrease or remove sensitivity to low contrast interest points that may be sensitive to noise or that may be poorly localized along edges.

Regarding orientation assignment, one or more orientations are assigned to each keypoint location identified via the keypoint localization based on local image gradient directions. All future operations may be performed on image data that has been transformed relative to the assigned orientation, scale, and location for each feature, thereby providing invariance to these transformations.

Regarding keypoint descriptor transformation, the local image gradients resulting from the orientation assignment are measured at the selected scale in the region around each keypoint. The local image gradients may then be transformed into a representation that allows for significant levels of local shape distortion and change in illumination.

An interesting aspect of this approach is that it generates large numbers of features that densely cover an image over the full range of scales and locations. For example, for a typical image size of five hundred by five hundred (500×500) pixels, this processing may give rise to about two thousand (2000) stable features, though this number may depend upon both image content and choices for various parameters. The relatively rapid approach for recognition may involve comparing the generated features with those extracted from a reference database using a Euclidean distance as a measure of proximity to the reference image. However this method may result in low accuracy. Multiclass SVM may therefore be utilized to increase the accuracy of the matching by which each individual hand pose may be represented and considered as a class.

The following pseudo text process represents an example of Kanade, Lucas, and Tomasi (KLT) flock detection. It is understood that the following pseudo text process may be implemented in any syntax appropriate for a given implementation. It is further understood that any other pixel intensity/displacement technique may be used as appropriate for a given implementation.

Initialization Processing:
1. Learn color histogram;
2. Identify n*k features to track with minimum distance;
3. Rank the identified features based on color and fixed hand mask; and
4. Select the n highest-ranked features tracking;

Flock Detection Processing:
1. Update KLT feature locations with image pyramids
2. Compute median feature
3. For each feature do:
   If:
      a) Less than min_dist from any other feature, or
      b) Outside a max range, centered at median, or
      c) Low match correlation
   Then:
      Relocate feature onto good color spot that meets the flocking conditions As can be seen from the above pseudo text processing, initialization includes learning a color histogram, identifying a set of features to track with minimum distance between the identified features, ranking the identified feature set, and selecting a subset of highest-ranked features for tracking. After the initialization processing is completed, the flock detection processing may begin. The flock detection processing includes updating KLT feature locations with image pyramids and computing a median feature. For each median feature, conditional processing may be performed. For example, if the respective feature is less than the defined minimum distance (min_dist) from any other feature, is outside a maximum (max) range centered at computed median, or has a low match correlation, then the feature may be relocated onto a color spot within the color histogram that meets the flocking conditions. In response to this processing, flock detection within an image may be performed.

Use of Trained Multiclass SVM to Infer Pose Type

Regarding use of trained multiclass SVM to infer a pose type, a one-to-one mapping of instances of an element with labels that are drawn from a finite set of elements may be established to achieve a form of learning or inference of a pose type. SVM may be considered a method of solving binary classification problems (e.g., problems in which the set of possible labels is of size two). Multiclass SVM extends this theory into a multiclass domain. It is recognized that conventional approaches to solving multiclass problems using support vector machines by reducing a single multiclass problem into multiple binary problems may not be practical for discriminating between hundreds of different hand pose types. The present subject matter discriminates a hand pose by detecting salient features within training and input images followed by mapping a one-to-one correspondence between each feature detected.

This one-to-one mapping allows matching the features across multiple 2D images, and additionally allows mapping across a 3D training model used to generate a training set. This information may then be utilized for optimizing pose inference at a later stage of the processing, as described in more detail below. As such, SIFT features may not only provide a localized description of the region of interest (ROI) but may also provide an idea of a global position of the region of interest especially when mapped to the 3D training model.

As such, the domain of interest that results is highly structured and interconnected such that positions of features and their relationship to other features in multiple images may also provide additional information via use of a multiclass SVM designed for interdependent and structured output spaces.

The classification problem may be formulated as follows. A training set is exemplified within Equation (1) below.

$$(x_1, y_1) \ldots (x_m, y_n) \text{ with labels } y_i \text{ in } [1 \ldots k] \quad \text{Equation (1)}$$

where $x_1$ is a set of m SIFT features $[t_1 \ldots t_m]$ with the variable "y" representing a vertical coordinate position of the descriptor, the variable "m" representing the number of SIFT features, and k representing the number of labels that denote various pose types. The variable "n" represents the size of the SIFT descriptor to process, and the variable "t" represents the complete feature vector $(x_1, y_1) \ldots (x_n, y_n)$.

The approach of this method is to solve the optimization problem referenced below in Equation (2).

$$\min 1/2 \sum_{i=1 \ldots k} wi * wi + C/n \sum_{i=1 \ldots n} \delta i \quad \text{Equation (2)}$$

subject to: for all $y[1 \ldots k]:[x_1 \cdot w_{y1}] \geq [x_1 \cdot w_y] + 100 * \Delta(y_1, y) - \delta_1$
and
for all $y[1 \ldots k]:[x_n \cdot w_{yn}] \geq [x_n \cdot w_y] + 100 * \Delta(y_n, y) - \delta_n$ The constant "C" represents a regularization parameter that trades off margin size and training error. The element $\Delta(y_n, y)$ represents a loss function that returns zero (0) if $y_n$ equals y, and 1 otherwise. The variable "w" represents an initial weight parameter that depends on the distance of the pixel (x,y) to the location of the joints within the actually 3D mocap data, the variable "n" represents the size of the descriptor, the variable "k" represents a number of labels that define the various hand poses, and "y" represents the vertical coordinate position of the description in the image.

Regarding database sampling, obtaining a suitable set of training data improves the accuracy of an inference method. A small database that uniformly samples all natural hand configurations and that excludes redundant samples may be preferred as appropriate for a given implementation. Training for the multiclass SVM described herein may be performed using an iterative approach.

For example, a suitable training set of, for example, four thousand (4000) hand images extracted from video frames obtained from any available motion capture (mocap) database may be collected. Such data may also include three dimensional (3D) joint data as well as 2D synthesized images which may be used to establish correspondences and/or correlations that increase pose inference accuracy. Each set may be divided into sets of two for training and testing purposes. As such, processing may begin, for example, with a set of one hundred (100) images. Set counts may then be increased by one hundred (100) images for each iteration. At each iteration, a root mean square error may be measured between test labels. In such an implementation, a set of as few as one thousand four hundred (1400) images may be utilized in a sample database to yield acceptable results, again as appropriate for a given implementation.

Regarding training parameters, results may be optimized for input to an IK solver, and centroids may be calculated for each synthetically generated training image. These synthetically generated training image and calculated centroids may be associated with joint data from a 3D mocap database, such as described above. Training and extraction of a feature vector, such as a feature vector of 60 elements, may be used. Such a numeric quantity represents a heuristic estimate that may be used to eliminate the effect of outlier data elements in a given feature space. A regularization parameter may be used within a given multiclass SVM implementation to reduce/minimize an effect of bias in the dataset. An example regularization parameter may include, for example, seventy eight one hundredths (0.78). This value may be determined by iteratively training the multiclass SVM with incrementing regularization values until the root mean square (RMS) value of error is less than a desired error level, such as for example one tenth (0.1).

Approximation of an Articulated Pose Using Inverse Kinematic (IK) Optimization

Regarding approximation of an articulated pose using IK optimization, inverse kinematics may be used to improve articulated pose. As described above, the present subject matter does not rely on color gloves. However, it is noted that the present subject matter may adapted to be utilized with gloved hands during cold weather, for example. With the present examples, bare-hand pose identification is performed. Centroids of SIFT descriptors are used to improve accuracy of pose estimation. It should be noted that, though processing without IK optimization may be able to distinguish ten (10) or more different pose types consistently, IK optimization allows removal of certain ambiguities in pose that pure SVM implementation may not resolve.

As such, an initial portion of the processing establishes a one-to-one mapping between the 3D pose data (e.g., from a mocap database) and the 2D SIFT features that have been detected. The image is broken up into thirty two by thirty two (32×32) image regions, which may be considered pixel patches for purposes of description. Features are extracted for each region separately. For each region, centroids of the features within the region are calculated and then that location is mapped to the corresponding 3D pose data. As a result, for any centroid feature within the training set, a three dimensional point on the real hand data may be identified.

During analysis of the features of the 32×32 pixel patches, the centroid may again be calculated for the features of each 32×32 pixel patch. Variances from the each centroid to the closest match in the training database may be compared and a determination may be made as to which of the joint constraints (e.g., hand bone joint constraints) may affect the IK processing.

Each feature centroid may then be mapped to its closest joint stored in the 3D mocap database data. From this mapping, the IK processing may determine the final position of the articulated hand such that the distance of the joints from that of the training image is minimized. Due to the complex nature of the joints within a hand, direct analytical calculation to get a closed form solution may be complex and may be computationally expensive in time. As such, a numerical technique to iteratively converge to an optimum solution may be utilized. Real time performance limitations may limit a number of iterations that may be performed for any given implementation. However, it is noted that processing may be resolved with reasonable accuracy (e.g., minimized) within fifty (50) iterations for certain implementations.

Accordingly, the centroids extracted from the 2D training sets may be mapped to their closest joints in the 3D mocap database data. In response to detection of an input image, a centroid may be extracted. A closest match of pose type may be inferred based on SVM results. For each pose type in the database, 3D joint data may be used as constraints for the IK processing. There is a one-to-one correspondence between features matched between the input image and the 2D training image, which in turn allows for a determination of a relationship to the 3D joints in the 3D mocap database data. Using this information, the problem of optimization decomposes into the following formulation represented within Equation (3) through Equation (5), followed by example pseudo code for iterative processing of these equations.

For a given input image where the feature centroids are considered target degrees of freedom (DOF) to obtain from a 2D training pose:

$$g = \{I_0 \ldots I_n\} \quad \text{Equation (3)}$$

The result "g" represents the set containing all of the "n" joints obtained from the 3D mocap data, which may be considered a "ground truth" position of the hand pose (e.g., a known truthful orientation of the joints), the variable "I" represents a vector depicting the individual joint position and orientation, and the variable "n" represents the number of joints in the 3D mocap data model.

With $\Phi$ representing a current set of joints for the inferred training pose.

and $$e = \{C_0 \ldots C_n\} \quad \text{Equation (4)}$$

The result "e" represents the set containing all the "n" joints inferred from the detection phase, while the variable "C" represents the vector representing the orientation and position of individual joints, and the variable "n" represents the number of joints in the hand model, with the result representing the inferred training pose features as the current end effectors. The current end effectors may be considered as the joints of the inferred training pose. The orientation and position of the current end effectors is changed iteratively until a difference between their position and the joints in the ground truth joint position is minimized.

To minimize error defined as:

$$\alpha = \sqrt{e-g} \quad \text{Equation (5)}$$

The result sigma represents the minimized error.

Below are example iterative steps that may be used to solve the problem, represented in pseudo code form.

```
While (α<threshold)
{
    Compute J(e,Φ) //for the current pose
    Compute J⁻¹//invert the Jacobian matrix
    Δe = β(g − e)//select approximate step
    ΔΦ = J⁻¹ · Δe//apply change to DOF's
    Φ = Φ + ΔΦ//apply change to DOF's
    Compute new e vector
}
```

As can be seen from this example pseudo code, the processing iterates as long as the error is below a defined/configured threshold. The iterative processing includes computing a Jacobian matrix of inferred training pose features vector for the current inferred training pose. The Jacobian matrix is then inverted. An approximation is selected for the current set of joints. The selected approximation is applied to determine a change to the target degrees of freedom (DOF) for the current set of joints. The change to the target degrees of freedom (DOF) for the current set of joints is applied to the current joints in the hand model that were initialized to the inferred training pose. A new error vector is calculated with respect to the ground truth position of joints obtained from the motion capture data. As described above, the processing iterates as long as the error is below a defined/configured threshold. It is noted that the IK implementation may operate as a separate process that runs concurrently with the detection system, though these processing operations may be integrated into one process.

FIG. 3 through FIG. 7 below describe example processes that may be executed by such devices, such as the television 100, to perform the automated real time hand tracking, pose classification, and interface control associated with the present subject matter. Many other variations on the example processes are possible and all are considered within the scope of the present subject matter. The example processes may be performed by modules, such as the hand tracking and pose processing module 216 and/or executed by the processor 202, associated with such devices. It should be noted that time out procedures and other error control procedures are not illustrated within the example processes described below for ease of illustration purposes. However, it is understood that all such procedures are considered to be within the scope of the present subject matter.

Figure 3:
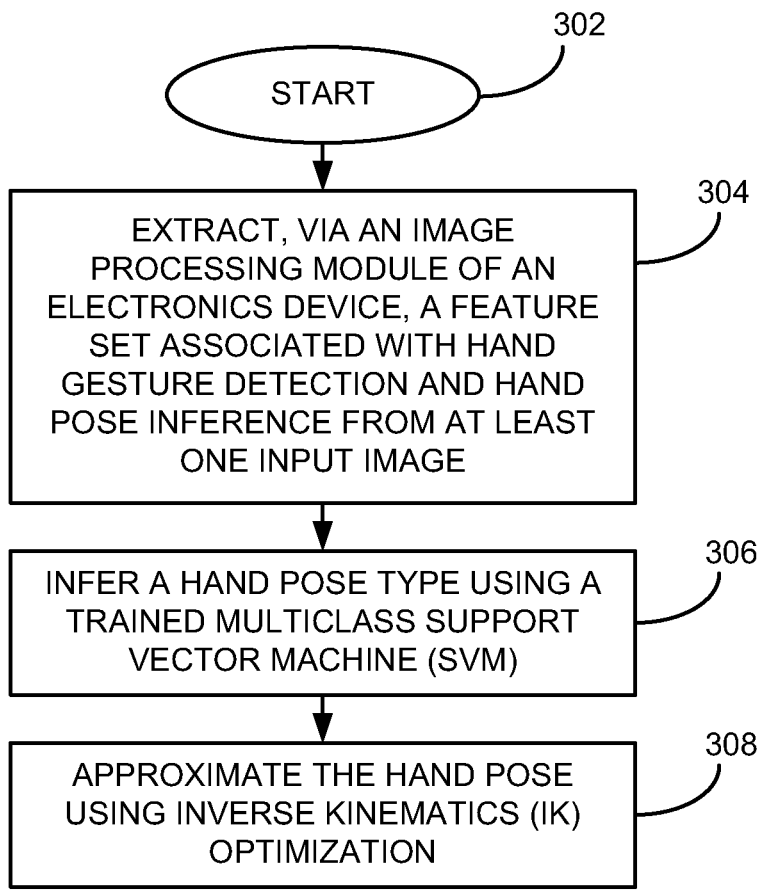
FIG. 3 is a flow chart of an example of an implementation of a process that provides automated real time hand tracking, pose classification, and interface control consistent with certain embodiments of the present invention.

FIG. 3 is a flow chart of an example of an implementation of a process 300 that provides automated real time hand tracking, pose classification, and interface control. The process 300 starts at 302. At block 304, the process 300 extracts, via an image processing module of an electronics device, a feature set associated with hand gesture detection and hand pose inference from at least one input image. At block 306, the process 300 infers a hand pose type using a trained multiclass support vector machine (SVM). At block 308, the process 300 approximates the hand pose using inverse kinematics (IK) optimization.

Figure 4:
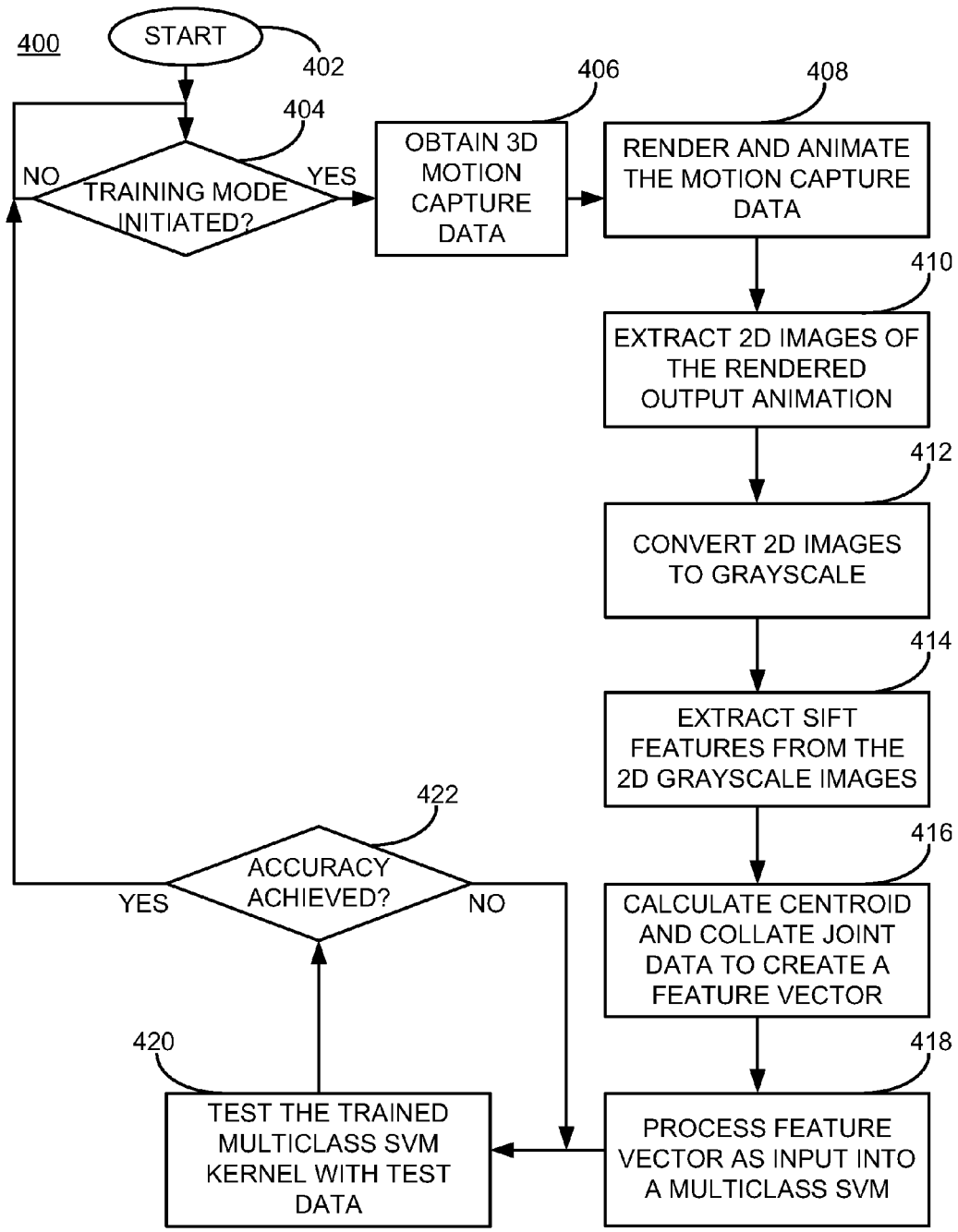
FIG. 4 is a flow chart of an example of an implementation of a process that provides training processing associated with automated real time hand tracking, pose classification, and interface control consistent with certain embodiments of the present invention.

FIG. 4 is a flow chart of an example of an implementation of a process 400 that provides training processing associated with automated real time hand tracking, pose classification, and interface control. The process 400 starts at 402. At decision point 404, the process 400 makes a determination as to whether a training mode has been initiated, such as via user input, first-time power up, or other form of initiation of entry into a training mode for a consumer electronics device. In response to determination that the training mode has been initiated, the process 400 obtains 3D motion capture (mocap) data, such as described above, at block 406. Obtaining the mocap data may include retrieving a text file containing position and orientation of joints for each frame of an animation. An example mocap file may include a sequence of hundreds of frames that depict one complete movement of a hand.

At block 408, the process 400 renders and animates the sequence of frames associated with the mocap data. Rendering and animating the sequence of frames associated with mocap data may include reading the mocap data file frame by frame and creating a 3D mesh that looks like a hand, where the position and orientation of the hand is determined by the joint data stored in the mocap data file for each frame. Rendering and animating the sequence of frames associated with mocap data may include rendering and animating the mocap data using, for example, OpenGL® or other graphics library.

At block 410, the process 400 extracts 2D images from the 3D rendered output of the animation. For example, 2D portable network graphics (PNG) images may be created for each 3D rendered frame of the mocap data. The 2D PNG images represent color images of each frame of the 3D rendered output saved to an image file similar in format to a camera picture.

At block 412, the process 400 converts the extracted 2D images to grayscale. Each 2D image may be converted into a black and white format image. As such, for each image only the intensity information is kept and all additional color information may be discarded. Discarding the additional color information may help to reduce effects of noise in the mocap data or the extracted 2D image data.

At block 414, the process 400 extracts scale invariant feature transforms (SIFT) features from the 2D grayscale images. As described above, SIFT represents a technique that may be used to obtain features from an image that do not change when subjected to rotation, translation, and scaling. Features may be described as a point on the 2D image represented by coordinates, such as "x" and "y" position within an image. For every image extracted from the mocap training data, this processing may be applied to obtain an array of coordinates (e.g., x,y position) in the image that are locations that do not change for a hand from frame to frame. Examples of such regions include tips of a finger, lines formed when fingers are curled, or other such regions.

At block 416, the process 400 calculates a centroid and collates the joint data to create a feature vector. For example, the centroid may be calculated from the coordinates (e.g., the x,y position points) detected within the image. This may include calculating an average (e.g., x1+x2+ ... +xn/n, where n is the number of points) over the array of coordinates. Additionally, the distance of the centroid from each the joints of the hand may be calculated. The joint information may be obtained from the original 3D mocap data. If only the coordinates (e.g., x,y position) of the joint are used, the distance may be calculated as an approximation. However, this approximation represents a unique value that may be used to identify differences between a current pose and the 3D mocap data. For the 3D mocap data, there are often sixteen (16) joints, each depicting the effect of a bone in the hand, for example phalanges, the middle bone in a finger, or other bones. Accordingly, this processing yields a feature vector that is an array of sixty (60) coordinates (e.g., (x,y) positions). The feature vector may be obtained from the SIFT extraction, a centroid position (e.g., (cx,cy)), and the joint centroid distance which may be represented as an array of distances (e.g., {d1, d2, d3 .... d16}). It should be noted, however, that this example represents only one possible format of the feature vector.

At block 418, the process 400 processes the feature vector as input into a multiclass SVM. As described above, SVM stands for support vector machine and represents a supervised learning method during the training phase. The processing is performed by providing a feature vector and a label depicting a type for the feature vector. For example, a feature vector may be provided for a hand with a palm facing the camera. Such a feature vector may have a label assigned to it as "palm front." Similarly, this processing may be performed for a quantity, such as two hundred (200) feature vectors, with each feature vector being assigned such a label. Upon completion of processing of all available feature vectors, this processing may be executed for several hours using various parameters to, for example, analyze a number and define an equation that has the feature vectors as its variables, and that may be used to evaluate to a numerical value that is unique for each label. These types of equations represent multivariate equations. As such, a multiclass SVM takes in data in forms of numbers and attempts to approximate an equation that generated those numbers while being constrained by rules that each of the numbers must fall into one of the assigned labels.

At block 420, the process 400 tests the trained multiclass SVM kernel with test data. After the training process is completed, the trained multiclass SVM may be referred to as a "kernel." Test data may be input into this kernel for evaluation. The test data may include feature vectors that have been pre-labeled, which may allow tracking that the correct label results from the trained multiclass SVM kernel. For example, for a hand feature vector, an input feature vector with all fingers closed may be assigned a pre-label of "closed hand" for this pose. Feeding this feature vector into the trained multiclass SVM kernel may be performed and the results checked to determine whether the prediction returned from the trained multiclass SVM kernel is a label of "closed hand." If the label "closed hand" is returned, the trained multiclass SVM kernel predicted the pose correctly. If the label "closed hand" is not returned, then the prediction may be considered incorrect, and further training may be performed. It should additionally be noted that, for any given quantity, again for example two hundred (200) feature vectors trained, that quantity of feature vectors may be tested to obtain a percentage value of accuracy. Training may continue until the accuracy of prediction achieves a target accuracy level, such as for example, eighty five to ninety percent (85-90%) accuracy.

As such, at decision point 422, the process 400 makes a determination as to whether the target accuracy level has been achieved. In response to determining that the target accuracy level has not been achieved, the process 400 returns to block 420 to process more test data and iterates as described above. In response to determining that the target accuracy level has been achieved, the process 400 returns to decision point 404 to await a new request to enter training mode.

Accordingly, the process 400 obtains 3D mocap data, and renders and animates that data. The process 400 extracts 2D images from the rendered and animated 3D mocap data. The process 400 extracts SIFT features from grayscale-converted 2D images, calculates a centroid, and correlates joint data to create a feature vector. The process 400 processes feature vector(s) as input into multiclass SVM and tests a resultant trained multiclass SVM with test data.

Figure 5:
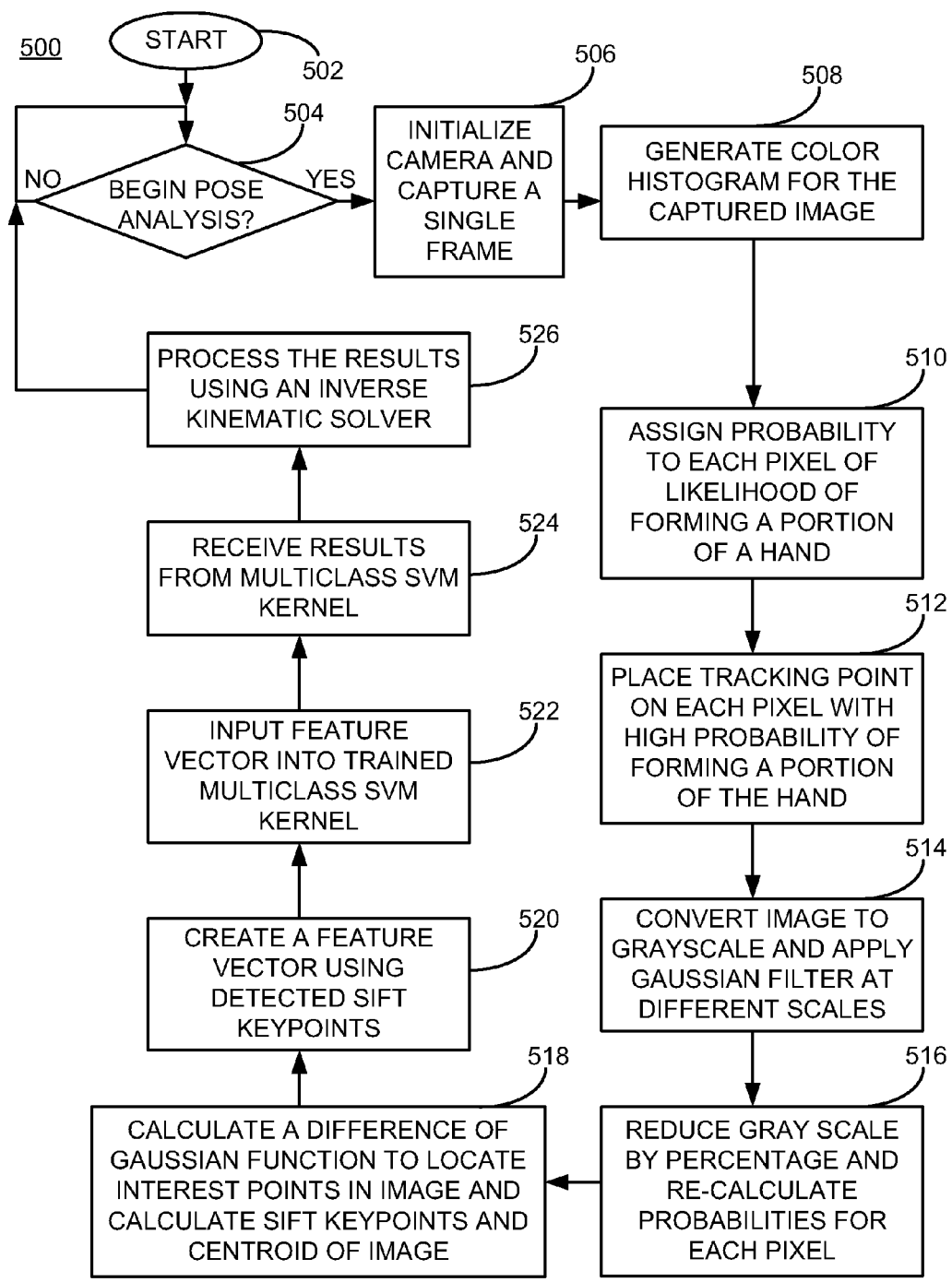
FIG. 5 is a flow chart of an example of an implementation of a process that provides detection and pose recognition processing associated with automated real time hand tracking, pose classification, and interface control consistent with certain embodiments of the present invention.

FIG. 5 is a flow chart of an example of an implementation of a process 500 that provides detection and pose recognition processing associated with automated real time hand tracking, pose classification, and interface control. The process 500 starts at 502. At decision point 504, the process 500 makes a determination as to whether to begin pose analysis including pose detection and recognition. Pose analysis may begin for example, in response to detection of motion via a camera, such as the camera 112, or in response to detection of a user input request associated with analysis. For purposes of the present example, it is assumed that the camera 112 is not initialized and that the determination to begin pose analysis is followed by processing to initialize the camera 112.

As such, in response to determining to begin pose analysis, the process 500 initializes the camera 112 and captures a single frame at block 506. At block 508, the process 500 generates a color histogram for image within the captured frame. At block 510, the process 500 assigns probability values, based upon known hand color histogram information for each pixel within the image, of a likelihood of each pixel forming a portion of a hand. This processing allows localization of the hand from background image content. At block 512, the process 500 places a tracking point on pixels that have very high probability of forming a portion of the hand. These tracking points represent the features that will be tracked across subsequent frames.

At block 514, the process 500 converts the image from color to grayscale and applies a Gaussian filter at different scales to the image. This processing may be performed for both the pixel intensity/displacement and the SIFT feature extraction in one loop to improve processing speed. At block 516, the process 500 reduces the scale of the image by ten percent (10%) and re-calculates the probabilities for each pixel, as described above. This processing creates an image pyramid and reduces the effect of noise. This processing also allows tracking features across varying depths and distances as the hand moves away from, or closer to, the camera.

At block 518, the process 500 calculates a difference of Gaussian function to locate the interest points using the results from the Gaussian filtering in different scales and calculates a centroid for the image. Interest points may be represented by coordinates (e.g., x,y points) in the grayscale image. From this interest point information, SIFT keypoints may be calculated using a mechanism, such as orientation assignment, which basically involves assigning a consistent orientation to each keypoint based on local image properties, for example by calculating the inverse tangent (tan) of the pixel and its neighboring pixels, and removing edge response. The tracking points placed in the image may use the identified interest point(s) to calculate the centroid of the image. The centroid of the image may be assumed for purposes of example to be the center of a detected hand.

At block 520, the process 500 creates a feature vector using the detected SIFT keypoints. The feature vector may include, for example, the best sixty (60) points obtained from the image. The feature vector may be stored as an array, such as within the hand tracking and pose processing storage area 212 of the memory 208. The centroid may be calculated as a result of pixel intensity/displacement processing and may be added to this array. Distances from the centroid may be calculated from the top sixteen (16) SIFT point locations. This processing creates a feature vector similar to the one formed during the training phase described above. The SIFT features used to calculate the joint distances may not form an exact match. However, the SIFT features provide a reasonable approximation of edges formed due to bending of fingers because joints represent points that usually show discernable change in contrast.

At block 522, the process 500 inputs the feature vector into the trained multiclass SVM kernel, such as the support vector machine trained during the training phase/mode described in association with FIG. 4 above. As described above, the multiclass SVM represents a complex mathematical function that approximately defines the data it was trained with using the feature vector as parameters. Because the function is already defined by the training phase/mode, the result may be calculated rapidly in response to sending the feature array to the multiclass SVM.

At block 524, the process 500 receives the result from the multiclass SVM kernel. The result may be returned as one of a quantity (e.g., eight (8)) of labels used to train the multiclass SVM. The quantity chosen may be considered to represent the number of distinct hand positions that may be detected. As such, with an example of eight (8) labels, the process 500 may detect eight (8) distinct hand positions. Increased training processing and label quantity may increase the number of distinct hand positions that may be detected.

At block 526, the process 500 further processes the results using an inverse kinematic (IK) solver. Because the label is known, the process 500 has an approximation/estimation of the hand pose given that each label is associated with one hand pose. The position of each of the joints in this detected pose is also known. Further noting that it is assumed that the final pose was detected using the top sixteen (16) SIFT descriptors (which are assumed to be the final position of the joints), the original hand pose joints may be moved to the same position where the SIFT points are located. This processing is performed using the IK Solver.

Because the joints are connected to each other and have fixed constrained relationships which each other and varying degrees of freedom (DOF), the movement of the original hand pose to the SIFT keypoint locations using an IK solver may be done so that the constraints are satisfied. It should be noted that often the locations will not match exactly. As such, the IK Solver closely approximates the joint locations and stops when it is believed the joints are as close to the final position as the IK solver processing may determine. This stage or processing may be considered the final pose of the hand. The output of the IK solver may include a quantity (e.g., sixteen (16)) of numbers that depicts the joint location and orientation. It should be noted that, though not depicted within the process 500, the joint location and orientation may be used to animate the 3D hand and may result in the final pose shown on the screen, such as the display 104. The process 500 returns to decision point 504 and awaits another indication to begin pose analysis.

As such, the process 500 initializes a camera and captures a single frame. Utilizing the single frame the process 500 generates a color histogram and assigns a probability to each pixel of a likelihood of the pixel forming a portion of a hand. A tracking point is placed on each pixel and the image is converted to grayscale. The grayscale image is iteratively reduced and the probabilities are re-calculated. A difference of Gaussian function is calculated to locate interest points. SIFT keypoints are calculated and a feature vector is created using the SIFT keypoints. The feature vector is input into a trained multiclass SVM and the results are processed using an IK solver to map the results to a final hand position within the trained hand data.

Figure 6:
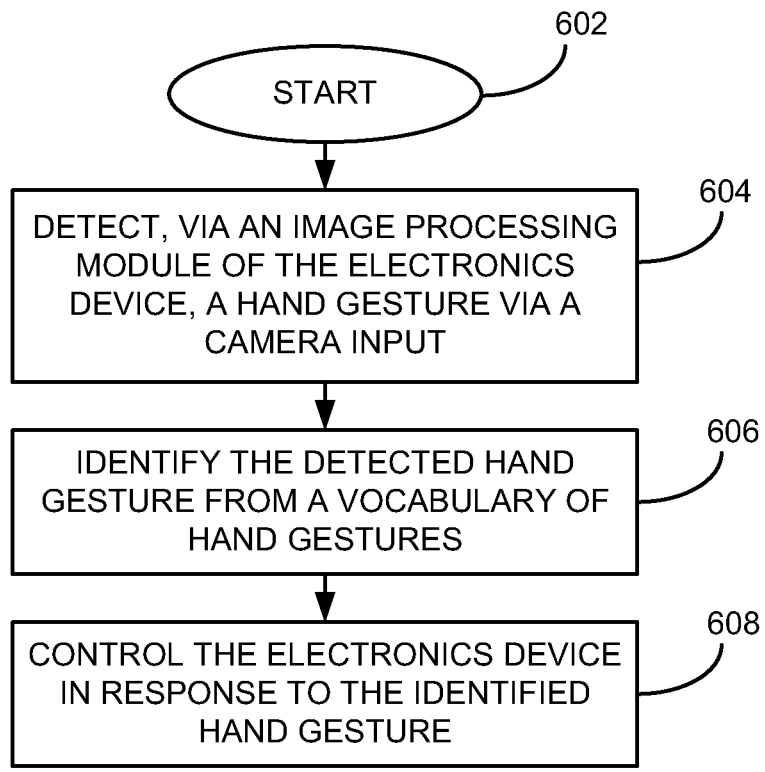
FIG. 6 is a flow chart of an example of an implementation of a process that provides electronic device user interface processing associated with automated real time hand tracking, pose classification, and interface control consistent with certain embodiments of the present invention.

FIG. 6 is a flow chart of an example of an implementation of a process 600 that provides electronic device user interface processing associated with automated real time hand tracking, pose classification, and interface control. The process 600 starts at 602. At block 604, the process 600 detects, via an image processing module of the electronics device, a hand gesture via a camera input. At block 606, the process 600 identifies the detected hand gesture from a vocabulary of hand gestures. At block 608, the process 600 controls the electronics device in response to the identified hand gesture.

Figure 7:
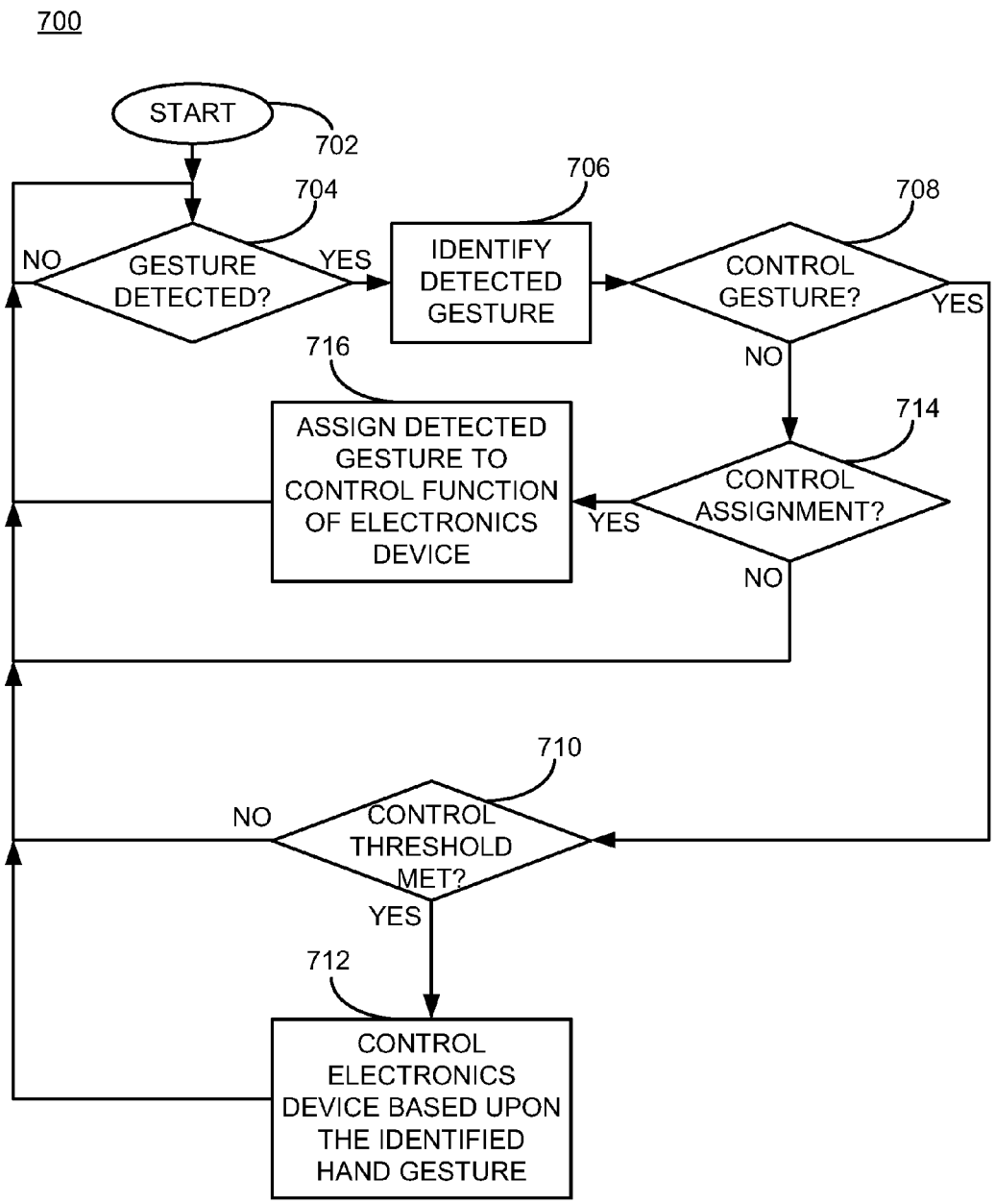
FIG. 7 is a flow chart of an example of an implementation of a process that provides electronic device user interface processing and pose assignment to control functions of an electronic device associated with automated real time hand tracking, pose classification, and interface control consistent with certain embodiments of the present invention.

FIG. 7 is a flow chart of an example of an implementation of a process 700 that provides electronic device user interface processing and pose assignment to control functions of an electronic device associated with automated real time hand tracking, pose classification, and interface control. The process 700 starts at 702. At decision point 704, the process 700 makes a determination as to whether a gesture has been detected. It is understood that processing, such as that described above in association with FIG. 5, may be used to determine whether a gesture has been detected. Detecting the hand gesture may include detecting a bare-hand position, as described above. Further, detecting the hand gesture may include detecting a sequence of bare-hand positions.

In response to determining that a gesture has been detected, the process 700 identifies the detected gesture at block 706. The detected hand gesture may be identified, for example, from a vocabulary of hand gestures.

At decision point 708, the process 700 makes a determination as to whether the identified gesture is associated with a control function of an electronics device. For example, a hand gesture may be associated with turning on the electronics device, turning off the electronics device, adjusting a volume of an audio output, or other control function of the electronics device.

In response to determining that the identified gesture is associated with a control function of an electronics device, the process 700 makes a determination as to whether the hand gesture has been detected for a threshold duration of time associated with control of the electronics device at decision point 710. A control threshold may be used, for example, to implement hysteresis to the electronic device controls to eliminate false control signals. The configured control threshold may include any suitable range for a given implementation, such as for example, two hundred milliseconds (200 ms) or a higher or lower duration as appropriate for a given implementation.

In response to determining that the hand gesture has been detected for a threshold duration of time associated with control of the electronics device, the process 700 controls the electronics device in response to the identified hand gesture at block 712. For example, controlling the electronics device in response to the identified hand gesture may include turning the electronics device on, turning the electronics device off, adjusting an output volume, or any other control function appropriate for a given implementation.

In response to completion of controlling the electronics device in response to the identified hand gesture at block 712 or in response to determining that the hand gesture has not been detected for a threshold duration of time at decision point 710, the process 700 returns to decision point 704 to await detection of another hand gesture and iterates as described above.

Returning to the description of decision point 708, in response to determining that the identified gesture is not associated with a control function of an electronics device, the process 700 makes a determination at decision point 714 as to whether an indication has been detected instructing assignment of the identified hand gestured to a control function of the electronics device. For example, a separate input, such as via a remote control device (not shown) or touchscreen input (not shown), may be used to indicate assignment of the identified gesture to a control function of the electronics device. Alternatively, as described above, the indication may be received as an identified gesture. In such an implementation, additional processing may be performed as described above in association with decision point 704 and block 706 to detect and identify a second hand gesture to be used as the assigned hand gesture for the control function of the electronics device. This additional processing may be considered a portion of the processing at decision point 714. In either implementation, in response to determining that a control assignment has been indicated, the process 700 assigns the detected gesture (or the second detected gesture as appropriate for the given implementation) to the control function of the electronics device at block 716. Upon completion of assignment of the detected gesture (or the second detected gesture) to the control function of the electronics device at block 716, or in response to determining that an indication has not been detected instructing assignment of the identified hand gestured to a control function at decision point 714, the process 700 returns to decision point 704 to await detection of another hand gesture and iterates as described above.

As such, the process 700 detects and identifies hand gestures and controls an electronics device based upon the identified hand gesture. The process 700 also processes detected hand gestures to provide hysteresis and to avoid false positives related to hand gesture detection. The process 700 further assigns gestures to control functions of the electronics device. Many other possibilities exist for hand gesture electronic device control processing and all are considered within the scope of the present subject matter.

Thus, in accord with certain implementations, a method of controlling an electronics device via hand gestures involves detecting, via an image processing module of the electronics device, a bare-hand position via a camera input based upon a detected sequence of bare-hand positions; determining whether the bare-hand position has been detected for a threshold duration of time; identifying the detected bare-hand position from a vocabulary of hand gestures, where the identified bare-hand position includes a hand gesture associated with powering on the electronics device; and controlling, in response to determining that the bare-hand position has been detected for the threshold duration of time, the electronics device in response to the identified bare-hand position by powering on the electronics device.

In another implementation, a computer readable storage medium may store instructions which, when executed on one or more programmed processors, carry out a process of controlling an electronics device via hand gestures involving detecting a bare-hand position via a camera input based upon a detected sequence of bare-hand positions; determining whether the bare-hand position has been detected for a threshold duration of time; identifying the detected bare-hand position from a vocabulary of hand gestures, where the identified bare-hand position includes a hand gesture associated with powering on the electronics device; and controlling, in response to determining that the bare-hand position has been detected for the threshold duration of time, the electronics device in response to the identified bare-hand position by powering on the electronics device.

In certain implementations, a method of controlling an electronics device via hand gestures involves detecting, via an image processing module of the electronics device, a hand gesture via a camera input; identifying the detected hand gesture from a vocabulary of hand gestures; and controlling the electronics device in response to the identified hand gesture.

In certain implementations, the method of controlling an electronics device via hand gestures involving detecting, via the image processing module of the electronics device, the hand gesture via the camera input involves detecting a bare-hand position. In certain implementations, the method of detecting, via the image processing module of the electronics device, the hand gesture via the camera input involves detecting a sequence of bare-hand positions. In certain implementations, the identified hand gesture includes a hand gesture associated with powering on the electronics device and the method of controlling the electronics device in response to the identified hand gesture involves powering on the electronics device. In certain implementations, the identified hand gesture includes a hand gesture associated with powering off the electronics device and the method of controlling the electronics device in response to the identified hand gesture involves powering off the electronics device. In certain implementations, the method further involves determining whether the hand gesture associated with the control of the electronics device has been detected for a threshold duration of time; and the method of detecting, via the image processing module of the electronics device, the hand gesture via the camera input involves detecting the hand gesture associated with the control of the electronics device for the threshold duration of time. In certain implementations, the method further involves determining whether the hand gesture associated with the control of the electronics device has been detected for a threshold duration of time; and the method of identifying the detected hand gesture from the vocabulary of hand gestures involves identifying the detected hand gesture from the vocabulary of hand gestures in response to determining that the hand gesture associated with the control of the electronics device has been detected for the threshold duration of time. In certain implementations, the method further involves detecting user input indicating assignment of one of the vocabulary of hand gestures to a control function of the electronics device; and assigning the one of the vocabulary of hand gestures to the control function of the electronics device. In certain implementations, the method of detecting the user input indicating the assignment of the one of the vocabulary of hand gestures to the control function of the electronics device involves detecting a hand gesture associated with the assignment of the one of the vocabulary of hand gestures to the control function of the electronics device.

In another implementation, a computer readable storage medium may store instructions which, when executed on one or more programmed processors, carry out a process of controlling an electronics device via hand gestures involving detecting a hand gesture via a camera input; identifying the detected hand gesture from a vocabulary of hand gestures; and controlling the electronics device in response to the identified hand gesture.

In certain implementations, a method of hand position detection involves extracting, via an image processing module of an electronics device, a feature set associated with hand gesture detection and hand pose inference from a plurality of input images by tracking a region of interest (ROI) between subsequent video frames of the plurality of input images as a flock of features; triggering scale invariant feature transforms (SIFT) feature extraction; calculating an optical flow path of the flock of features; measuring brightness gradients in multiple directions across the plurality of input images; generating image pyramids from the measured brightness gradients; extracting pixel intensity/displacement features and the SIFT features using the generated image pyramids; and applying a cascade filter in association with extracting the pixel intensity/displacement features and the SIFT features from the generated image pyramids; the method involves inferring a hand pose type using a trained multiclass support vector machine (SVM) by detecting at least one feature within a training image and the plurality of input images; and performing a one-to-one mapping of instances of the at least one feature within the plurality of input images with at least one label drawn from a finite set of elements, where the at least one label includes at least one label generated during a training phase based upon a motion capture three dimensional (3D) data set; and the method involves approximating the hand pose using inverse kinematics (IK) optimization by partitioning the plurality of input images into a plurality of processing regions; determining a centroid of features within each of the plurality of processing regions; mapping a location of each feature centroid onto three dimensional (3D) pose data associated with a motion capture data set; comparing variances from each feature centroid to a closest match within the 3D pose data; determining which of a plurality of joint constraints affect the IK optimization; mapping each feature centroid to a closest joint stored within the 3D pose data; minimizing a distance of each mapped closest joint within the training image based upon the 3D pose data; and determining a final hand position based upon the minimized distance of each mapped closest joint within the training image.

In another implementation, a computer readable storage medium may store instructions which, when executed on one or more programmed processors, carry out a process of hand position detection involving extracting, via an image processing module of an electronics device, a feature set associated with hand gesture detection and hand pose inference from a plurality of input images by tracking a region of interest (ROI) between subsequent video frames of the plurality of input images as a flock of features; triggering scale invariant feature transforms (SIFT) feature extraction; calculating an optical flow path of the flock of features; measuring brightness gradients in multiple directions across the plurality of input images; generating image pyramids from the measured brightness gradients; extracting pixel intensity/displacement features and the SIFT features using the generated image pyramids; and applying a cascade filter in association with extracting the pixel intensity/displacement features and the SIFT features from the generated image pyramids; the process involving inferring a hand pose type using a trained multiclass support vector machine (SVM) by detecting at least one feature within a training image and the plurality of input images; and performing a one-to-one mapping of instances of the at least one feature within the plurality of input images with at least one label drawn from a finite set of elements, where the at least one label includes at least one label generated during a training phase based upon a motion capture three dimensional (3D) data set; and the process involving approximating the hand pose using inverse kinematics (IK) optimization by partitioning the plurality of input images into a plurality of processing regions; determining a centroid of features within each of the plurality of processing regions; mapping a location of each feature centroid onto three dimensional (3D) pose data associated with a motion capture data set; comparing variances from each feature centroid to a closest match within the 3D pose data; determining which of a plurality of joint constraints affect the IK optimization; mapping each feature centroid to a closest joint stored within the 3D pose data; minimizing a distance of each mapped closest joint within the training image based upon the 3D pose data; and determining a final hand position based upon the minimized distance of each mapped closest joint within the training image.

In certain implementations, a method of hand position detection involves extracting, via an image processing module of an electronics device, a feature set associated with hand gesture detection and hand pose inference from at least one input image; inferring a hand pose type using a trained multiclass support vector machine (SVM); and approximating the hand pose using inverse kinematics (IK) optimization.

In certain implementations, the method of hand position detection involving extracting, via the image processing module of the electronics device, the feature set associated with hand gesture detection and hand pose inference from the at least one input image involves measuring brightness gradients in multiple directions across the at least one input image; and generating image pyramids from the measured brightness gradients. In certain implementations, the method further involves extracting pixel intensity/displacement features and scale invariant feature transforms (SIFT) features using the generated image pyramids. In certain implementations, the method further involves applying a cascade filter in association with extracting the pixel intensity/displacement features and the SIFT features from the generated image pyramids. In certain implementations, the at least one input image includes a plurality of input images, and the method of extracting, via the image processing module of the electronics device, the feature set associated with hand gesture detection and hand pose inference from the at least one input image involves tracking a region of interest (ROI) between subsequent video frames of the plurality of input images as a flock of features; triggering scale invariant feature transforms (SIFT) feature extraction; and calculating an optical flow path of the flock of features. In certain implementations, the method of tracking the ROI between subsequent video frames of the plurality of input images as the flock of features involves tracking a two dimensional (2D) combination of pixel intensity/displacement features and a learned foreground color distribution. In certain implementations, the method of calculating the optical flow path of the flock of features involves applying at least one constraint on each of the flock of features such that the flock of features maintain a minimum distance from each other. In certain implementations, the method of inferring a hand pose type using the trained multiclass SVM involves detecting at least one feature within a training image and the at least one input image; and performing a one-to-one mapping of instances of the at least one feature within the at least one input image with at least one label drawn from a finite set of elements. In certain implementations, the at least one label includes at least one label generated during a training phase based upon a motion capture three dimensional (3D) data set. In certain implementations, the method of approximating the hand pose using IK optimization involves partitioning the at least one input image into a plurality of processing regions; determining a centroid of features within each of the plurality of processing regions; and mapping a location of each feature centroid onto three dimensional (3D) pose data associated with a motion capture data set. In certain implementations, the method of determining the centroid of features within each of the plurality of processing regions involves comparing variances from each feature centroid to a closest match within the 3D pose data; and determining which of a plurality of joint constraints affect the IK optimization. In certain implementations, the method further involves mapping each feature centroid to a closest joint stored within the 3D pose data. In certain implementations, the method further involves minimizing a distance of each mapped closest joint within a training image based upon the 3D pose data; and determining a final hand position based upon the minimized distance of each mapped closest joint within the training image. In certain implementations, the method further involves defining a configurable resolution threshold for image processing; and adjusting the configurable resolution threshold. In certain implementations, the method further involves storing the extracted feature set associated with the hand gesture detection and the hand pose inference.

In another implementation, a computer readable storage medium may store instructions which, when executed on one or more programmed processors, carry out a process of hand position detection involving extracting a feature set associated with hand gesture detection and hand pose inference from at least one input image; inferring a hand pose type using a trained multiclass support vector machine (SVM); and approximating the hand pose using inverse kinematics (IK) optimization.

An apparatus for controlling an electronics device via hand gestures consistent with certain implementations has a camera and a processor programmed to detect a bare-hand position via the camera based upon a detected sequence of bare-hand positions; determine whether the bare-hand position has been detected for a threshold duration of time; identify the detected bare-hand position from a vocabulary of hand gestures, where the identified bare-hand position includes a hand gesture associated with powering on the electronics device; and control, in response to determining that the bare-hand position has been detected for the threshold duration of time, the electronics device in response to the identified bare-hand position by powering on the electronics device.

An apparatus for controlling an electronics device via hand gestures consistent with certain implementations has a camera and a processor programmed to detect a hand gesture via the camera; identify the detected hand gesture from a vocabulary of hand gestures; and control the electronics device in response to the identified hand gesture.

In certain implementations, in being programmed to detect the hand gesture via the camera, the processor is programmed to detect a bare-hand position. In certain implementations, in being programmed to detect the hand gesture via the camera, the processor is programmed to detect a sequence of bare-hand positions. In certain implementations, the identified hand gesture includes a hand gesture associated with powering on the electronics device and, in being programmed to control the electronics device in response to the identified hand gesture, the processor is programmed to power on the electronics device. In certain implementations, the identified hand gesture includes a hand gesture associated with powering off the electronics device and, in being programmed to control the electronics device in response to the identified hand gesture, the processor is programmed to power off the electronics device. In certain implementations, the processor is further programmed to determine whether the hand gesture associated with the control of the electronics device has been detected for a threshold duration of time; and, in being programmed to detect the hand gesture via the camera, the processor is programmed to detect the hand gesture associated with the control of the electronics device for the threshold duration of time. In certain implementations, the processor is further programmed to determine whether the hand gesture associated with the control of the electronics device has been detected for a threshold duration of time; and, in being programmed to identify the detected hand gesture from the vocabulary of hand gestures, the processor is programmed to identify the detected hand gesture from the vocabulary of hand gestures in response to determining that the hand gesture associated with the control of the electronics device has been detected for the threshold duration of time. In certain implementations, the processor is further programmed to detect user input indicating assignment of one of the vocabulary of hand gestures to a control function of the electronics device; and assign the one of the vocabulary of hand gestures to the control function of the electronics device. In certain implementations, in being programmed to detect the user input indicating the assignment of the one of the vocabulary of hand gestures to the control function of the electronics device, the processor is programmed to detect a hand gesture associated with the assignment of the one of the vocabulary of hand gestures to the control function of the electronics device.

An apparatus for hand position detection consistent with certain implementations has a camera and a processor programmed to extract a feature set associated with hand gesture detection and hand pose inference from a plurality of input images received via the camera, the processor being further programmed to track a region of interest (ROI) between subsequent video frames of the plurality of input images as a flock of features; trigger scale invariant feature transforms (SIFT) feature extraction; calculate an optical flow path of the flock of features; measure brightness gradients in multiple directions across the plurality of input images; generate image pyramids from the measured brightness gradients; extract pixel intensity/displacement features and the SIFT features using the generated image pyramids; and apply a cascade filter in association with extracting the pixel intensity/displacement features and the SIFT features from the generated image pyramids; the processor is programmed to infer a hand pose type using a trained multiclass support vector machine (SVM), the processor being further programmed to detect at least one feature within a training image and the plurality of input images; and perform a one-to-one mapping of instances of the at least one feature within the plurality of input images with at least one label drawn from a finite set of elements, where the at least one label includes at least one label generated during a training phase based upon a motion capture three dimensional (3D) data set; and the processor is programmed to approximate the hand pose using inverse kinematics (IK) optimization, the processor being further programmed to partition the plurality of input images into a plurality of processing regions; determine a centroid of features within each of the plurality of processing regions; map a location of each feature centroid onto three dimensional (3D) pose data associated with a motion capture data set; compare variances from each feature centroid to a closest match within the 3D pose data; determine which of a plurality of joint constraints affect the IK optimization; map each feature centroid to a closest joint stored within the 3D pose data; minimize a distance of each mapped closest joint within the training image based upon the 3D pose data; and determine a final hand position based upon the minimized distance of each mapped closest joint within the training image.

An apparatus for hand position detection, consistent with certain implementations, has a camera and a processor programmed to extract a feature set associated with hand gesture detection and hand pose inference from at least one input image received via the camera; infer a hand pose type using a trained multiclass support vector machine (SVM); and approximate the hand pose using inverse kinematics (IK) optimization.

In certain implementations, in being programmed to extract the feature set associated with hand gesture detection and hand pose inference from the at least one input image received via the camera, the processor is programmed to measure brightness gradients in multiple directions across the at least one input image; and generate image pyramids from the measured brightness gradients. In certain implementations, the processor is further programmed to extract pixel intensity/displacement features and scale invariant feature transforms (SIFT) features using the generated image pyramids. In certain implementations, the processor is further programmed to apply a cascade filter in association with extracting the pixel intensity/displacement features and the SIFT features from the generated image pyramids. In certain implementations, the at least one input image includes a plurality of input images, and, in being programmed to extract the feature set associated with hand gesture detection and hand pose inference from the at least one input image received via the camera, the processor is programmed to track a region of interest (ROI) between subsequent video frames of the plurality of input images as a flock of features; trigger scale invariant feature transforms (SIFT) feature extraction; and calculate an optical flow path of the flock of features. In certain implementations, in being programmed to track the ROI between subsequent video frames of the plurality of input images as the flock of features, the processor is programmed to track a two dimensional (2D) combination of pixel intensity/displacement features and a learned foreground color distribution. In certain implementations, in being programmed to calculate the optical flow path of the flock of features, the processor is programmed to apply at least one constraint on each of the flock of features such that the flock of features maintain a minimum distance from each other. In certain implementations, in being programmed to infer a hand pose type using the trained multiclass SVM, the processor is programmed to detect at least one feature within a training image and the at least one input image; and perform a one-to-one mapping of instances of the at least one feature within the at least one input image with at least one label drawn from a finite set of elements. In certain implementations, the at least one label includes at least one label generated during a training phase based upon a motion capture three dimensional (3D) data set. In certain implementations, in being programmed to approximate the hand pose using IK optimization, the processor is programmed to partition the at least one input image into a plurality of processing regions; determine a centroid of features within each of the plurality of processing regions; and map a location of each feature centroid onto three dimensional (3D) pose data associated with a motion capture data set. In certain implementations, in being programmed to determine the centroid of features within each of the plurality of processing regions, the processor is programmed to compare variances from each feature centroid to a closest match within the 3D pose data; and determine which of a plurality of joint constraints affect the IK optimization. In certain implementations, the processor is further programmed to map each feature centroid to a closest joint stored within the 3D pose data. In certain implementations, the processor is further programmed to minimize a distance of each mapped closest joint within a training image based upon the 3D pose data; and determine a final hand position based upon the minimized distance of each mapped closest joint within the training image. In certain implementations, the processor is further programmed to define a configurable resolution threshold for image processing; and adjust the configurable resolution threshold. In certain implementations, the apparatus for hand position detection has a memory; and the processor is further programmed to store the extracted feature set associated with the hand gesture detection and the hand pose inference in the memory.

While certain embodiments herein were described in conjunction with specific circuitry that carries out the functions described, other embodiments are contemplated in which the circuit functions are carried out using equivalent elements executed on one or more programmed processors. General purpose computers, microprocessor based computers, microcontrollers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware, dedicated processors or combinations thereof.

Certain embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of hand position detection, comprising:
   extracting, via an image processing module of an electronics device, a feature set associated with hand gesture detection and hand pose inference from a plurality of input images by:
   tracking a region of interest (ROI) between subsequent video frames of the plurality of input images as a flock of features;
   triggering scale invariant feature transforms (SIFT) feature extraction;
   calculating an optical flow path of the flock of features;
   measuring brightness gradients in multiple directions across the plurality of input images;
   generating image pyramids from the measured brightness gradients;
   extracting pixel intensity and displacement features and the SIFT features using the generated image pyramids; and
   applying a cascade filter in association with extracting the pixel intensity/displacement features and the SIFT features from the generated image pyramids;
   inferring a hand pose type using a trained multiclass support vector machine (SVM) by:
   detecting at least one feature within a training image and the plurality of input images; and
   performing a one-to-one mapping of instances of the at least one feature within the plurality of input images with at least one label drawn from a finite set of elements, where the at least one label comprises at least one label generated during a training phase based upon a motion capture three dimensional (3D) data set; and
   approximating the hand pose using inverse kinematics (IK) optimization by:
   partitioning the plurality of input images into a plurality of processing regions;
   determining a centroid of features within each of the plurality of processing regions;
   mapping a location of each feature centroid onto three dimensional (3D) pose data associated with a motion capture data set;
   comparing variances from each feature centroid to a closest match within the 3D pose data;
   determining which of a plurality of joint constraints affect the IK optimization;
   mapping each feature centroid to a closest joint stored within the 3D pose data;
   minimizing a distance of each mapped closest joint within the training image based upon the 3D pose data; and
   determining a final hand position based upon the minimized distance of each mapped closest joint within the training image.

2. A computer readable storage medium storing instructions which, when executed on one or more programmed processors, carry out the method according to claim 1.

3. A method of hand position detection, comprising:
  extracting, via an image processing module of an electronics device, a feature set associated with hand gesture detection and hand pose inference from at least one input image;
  inferring a hand pose type using a trained multiclass support vector machine (SVM);
  approximating the hand pose using inverse kinematics (IK) optimization;
  where extracting, via the image processing module of the electronics device, the feature set associated with hand gesture detection and hand pose inference from the at least one input image comprises:
    measuring brightness gradients in multiple directions across the at least one input image; and
    generating image pyramids from the measured brightness gradients; and
    extracting pixel intensity and displacement features and scale invariant feature transforms (SIFT) features using the generated image pyramids.

4. The method according to claim 3, further comprising applying a cascade filter in association with extracting the pixel intensity/displacement features and the SIFT features from the generated image pyramids.

5. The method according to claim 3, where the at least one input image comprises a plurality of input images, and extracting, via the image processing module of the electronics device, the feature set associated with hand gesture detection and hand pose inference from the at least one input image comprises:
  tracking a region of interest (ROI) between subsequent video frames of the plurality of input images as a flock of features;
  triggering scale invariant feature transforms (SIFT) feature extraction; and
  calculating an optical flow path of the flock of features.

6. The method according to claim 5, where tracking the ROI between subsequent video frames of the plurality of input images as the flock of features comprises:
  tracking a two dimensional (2D) combination of pixel intensity and displacement features and a learned foreground color distribution.

7. The method according to claim 5, where calculating the optical flow path of the flock of features comprises applying at least one constraint on each of the flock of features such that the flock of features maintain a minimum distance from each other.

8. The method according to claim 3, where inferring a hand pose type using the trained multiclass SVM comprises:
  detecting at least one feature within a training image and the at least one input image; and
  performing a one-to-one mapping of instances of the at least one feature within the at least one input image with at least one label drawn from a finite set of elements.

9. The method according to claim 8, where the at least one label comprises at least one label generated during a training phase based upon a motion capture three dimensional (3D) data set.

10. The method according to claim 3, where approximating the hand pose using IK optimization comprises:
  partitioning the at least one input image into a plurality of processing regions;
  determining a centroid of features within each of the plurality of processing regions; and
  mapping a location of each feature centroid onto three dimensional (3D) pose data associated with a motion capture data set.

11. The method according to claim 10, where determining the centroid of features within each of the plurality of processing regions comprises:
  comparing variances from each feature centroid to a closest match within the 3D pose data; and
  determining which of a plurality of joint constraints affect the IK optimization.

12. The method according to claim 11, further comprising mapping each feature centroid to a closest joint stored within the 3D pose data.

13. The method according to claim 12, further comprising:
  minimizing a distance of each mapped closest joint within a training image based upon the 3D pose data; and
  determining a final hand position based upon the minimized distance of each mapped closest joint within the training image.

14. The method according to claim 3, further comprising:
  defining a configurable resolution threshold for image processing; and
  adjusting the configurable resolution threshold.

15. The method according to claim 3, further comprising storing the extracted feature set associated with the hand gesture detection and the hand pose inference.

16. A computer readable storage medium storing instructions which, when executed on one or more programmed processors, carry out the method according to claim 3.

17. An apparatus for hand position detection, comprising:
  a camera; and
  a processor programmed to:
    extract a feature set associated with hand gesture detection and hand pose inference from a plurality of input images received via the camera, where the processor is further programmed to:
      track a region of interest (ROI) between subsequent video frames of the plurality of input images as a flock of features;
      trigger scale invariant feature transforms (SIFT) feature extraction;
      calculate an optical flow path of the flock of features;
      measure brightness gradients in multiple directions across the plurality of input images;
      generate image pyramids from the measured brightness gradients;
      extract pixel intensity and displacement features and the SIFT features using the generated image pyramids; and
      apply a cascade filter in association with extracting the pixel intensity/displacement features and the SIFT features from the generated image pyramids;
    infer a hand pose type using a trained multiclass support vector machine (SVM), where the processor is further programmed to:
      detect at least one feature within a training image and the plurality of input images; and
      perform a one-to-one mapping of instances of the at least one feature within the plurality of input images with at least one label drawn from a finite set of elements, where the at least one label comprises at least one label generated during a training phase based upon a motion capture three dimensional (3D) data set; and
    approximate the hand pose using inverse kinematics (IK) optimization, where the processor is further programmed to:
      partition the plurality of input images into a plurality of processing regions;

determine a centroid of features within each of the plurality of processing regions;

map a location of each feature centroid onto three dimensional (3D) pose data associated with a motion capture data set;

compare variances from each feature centroid to a closest match within the 3D pose data;

determine which of a plurality of joint constraints affect the IK optimization;

map each feature centroid to a closest joint stored within the 3D pose data;

minimize a distance of each mapped closest joint within the training image based upon the 3D pose data; and determine a final hand position based upon the minimized distance of each mapped closest joint within the training image.

18. An apparatus for hand position detection, comprising:
a camera; and
a processor programmed to:
extract a feature set associated with hand gesture detection and hand pose inference from at least one input image received via the camera, where in being programmed to extract the feature set associated with hand gesture detection and hand pose inference from the at least one input image received via the camera, the processor is programmed to measure brightness gradients in multiple directions across the at least one input image, and generate image pyramids from the measured brightness gradients, and extract pixel intensity and displacement features and scale invariant feature transforms (SIFT) features using the generated image pyramids;
infer a hand pose type using a trained multiclass support vector machine (SVM); and
approximate the hand pose using inverse kinematics (IK) optimization.

19. The apparatus according to claim 18, where the processor is further programmed to apply a cascade filter in association with extracting the pixel intensity/displacement features and the SIFT features from the generated image pyramids.

20. The apparatus according to claim 18, where the at least one input image comprises a plurality of input images, and, where in being programmed to extract the feature set associated with hand gesture detection and hand pose inference from the at least one input image received via the camera, the processor is programmed to:
track a region of interest (ROI) between subsequent video frames of the plurality of input images as a flock of features;
trigger scale invariant feature transforms (SIFT) feature extraction; and
calculate an optical flow path of the flock of features.

21. The apparatus according to claim 20, where, in being programmed to track the ROI between subsequent video frames of the plurality of input images as the flock of features, the processor is programmed to:
track a two dimensional (2D) combination of pixel intensity and displacement features and a learned foreground color distribution.

22. The apparatus according to claim 20, where, in being programmed to calculate the optical flow path of the flock of features, the processor is programmed to apply at least one constraint on each of the flock of features such that the flock of features maintain a minimum distance from each other.

23. The apparatus according to claim 18, where, in being programmed to infer a hand pose type using the trained multiclass SVM, the processor is programmed to:
detect at least one feature within a training image and the at least one input image; and
perform a one-to-one mapping of instances of the at least one feature within the at least one input image with at least one label drawn from a finite set of elements.

24. The apparatus according to claim 23, where the at least one label comprises at least one label generated during a training phase based upon a motion capture three dimensional (3D) data set.

25. The apparatus according to claim 18, where, in being programmed to approximate the hand pose using IK optimization, the processor is programmed to:
partition the at least one input image into a plurality of processing regions;
determine a centroid of features within each of the plurality of processing regions; and
map a location of each feature centroid onto three dimensional (3D) pose data associated with a motion capture data set.

26. The apparatus according to claim 25, where, in being programmed to determine the centroid of features within each of the plurality of processing regions, the processor is programmed to:
compare variances from each feature centroid to a closest match within the 3D pose data; and
determine which of a plurality of joint constraints affect the IK optimization.

27. The apparatus according to claim 26, where the processor is further programmed to map each feature centroid to a closest joint stored within the 3D pose data.

28. The apparatus according to claim 27, where the processor is further programmed to:
minimize a distance of each mapped closest joint within a training image based upon the 3D pose data; and
determine a final hand position based upon the minimized distance of each mapped closest joint within the training image.

29. The apparatus according to claim 18, where the processor is further programmed to:
define a configurable resolution threshold for image processing; and
adjust the configurable resolution threshold.

30. The apparatus according to claim 18, further comprising:
a memory; and
where the processor is further programmed to store the extracted feature set associated with the hand gesture detection and the hand pose inference in the memory.

* * * * *